United States Patent
Hong

(10) Patent No.: US 7,592,715 B2
(45) Date of Patent: Sep. 22, 2009

(54) MULTIPLE SOURCES OF OPERATING POWER TO A LOAD

(75) Inventor: Daniel Hong, San Ramon, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/739,206

(22) Filed: Apr. 24, 2007

(65) Prior Publication Data

US 2008/0265672 A1   Oct. 30, 2008

(51) Int. Cl.
*H02J 3/38* (2006.01)
*H02J 9/00* (2006.01)

(52) U.S. Cl. .............................. 307/45; 307/23; 307/29; 307/44

(58) Field of Classification Search .............. 307/23, 307/29, 44, 45
See application file for complete search history.

(56) References Cited

U.S. PATENT DOCUMENTS

| | | | | |
|---|---|---|---|---|
| 5,656,869 A * | 8/1997 | Gluskoter et al. | ............. | 307/64 |
| 6,664,657 B2 * | 12/2003 | Hailey | ......................... | 307/52 |
| 7,030,771 B2 * | 4/2006 | Kinnard et al. | ............. | 340/653 |
| 2004/0179334 A1 | 9/2004 | Kinnard et al. | | |
| 2007/0073420 A1 * | 3/2007 | Lanni | ......................... | 700/22 |

OTHER PUBLICATIONS

Ultra Power Partner 325w 5.25in Drive Bay Power Supply, Xoxide, 2006 (http://www.xoxide.com/ultra-power-partner-350w.html, visited Jan. 22, 2008).*
"How to use two Power supplies on one computer," Multiple Power Supply Guide, Overclock.net—Overclocking.net, 12 pp. [Online] http://www.overclock.net/power-supplies/14455-multiple-power-supply-guide.html.
"New Products Release," !Newest computer parts such as atx power supply and rack mount case!, 2 pp. [Online] http://www.amtrade.com/pc_component/new_peripherals.htm.
"How to use two Power supplies on one computer," Multiple Power Supply Guide, Overclock.net—Overclocking.net, 12 pp. [Online] http://www.overclock.net/power-supplies/14455-multiple-power-supply-guide.html, 2005.
"New Products Release," !Newest computer parts such as atx power supply and rack mount case!, 2 pp. [Online] http://www.amtrade.com/pc_component/new_peripherals.htm, 2004.

* cited by examiner

*Primary Examiner*—Albert W Paladini
*Assistant Examiner*—Hal I Kaplan

(57) ABSTRACT

A system comprises a first power supply, a second power supply, and a load coupled to the first and second power supplies via separate power connectors. The load receives separate operating power from each of the first and second power supplies.

8 Claims, 2 Drawing Sheets

MULTIPLE SOURCES OF OPERATING POWER TO A LOAD

BACKGROUND

A computer comprises a power supply to convert an alternating current (AC) supply voltage (e.g., 120 VAC) to a suitable direct current (DC) voltage (e.g., 5 VDC). The power-delivering capacity of the power supply is designed to match or exceed the anticipated power consuming needs of the computer. Some computers have different configurations and modes of operation resulting in a wide range of power consumption. A system architect generally is forced to anticipate a worst-case power consumption need for the computer and select a power supply accordingly, thereby resulting in a power supply that is larger than is needed most of the time when the system is not operating at a worst-case power consumption situation.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
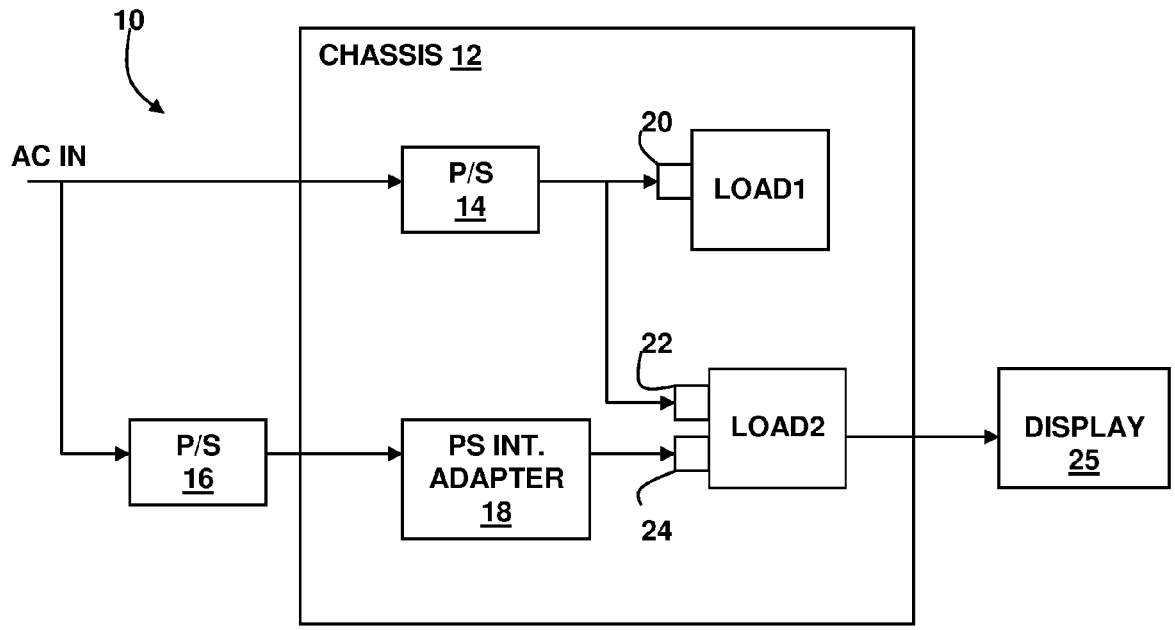
FIG. 1 shows a system comprising a load to which two power supplies supply power in accordance with various embodiments.

FIG. 1 illustrates a system 10 comprising first and second loads labeled as load1 and load2. Each load comprises one or more electrical components, circuit cards, etc. In some embodiments, system 10 comprises a computer and load1 comprises a processor, memory and other circuit components of a computer. In various embodiments, load2 comprises a graphics card which receives data from load1 for rendering on a display 25. The system 10 also comprises multiple power supplies 14 and 16.

The system also comprises a chassis 12 in which one or more of the components are mounted. For example, the power supply 14, load1, load2, and a power supply interface adapter 18 are provided in the chassis 12. Power supply 16 is not contained within the chassis 12 in some embodiments. As such, the power supply 14 comprises a power supply internal to the chassis 12 and power supply 16 comprises a power supply external to the chassis 12. Each power supply 14, 16 receives an input AC supply voltage (e.g., 120 VAC) and converts the AC voltage into one or more suitable DC voltages (e.g., 5 VDC).

A user may desire to operate a load in the system 10 that consumes more power than the power supply 14 is capable of providing given the other power demands on the power supply 14 from, for example, load1. As such, the user may install load2 in the chassis 12. Load2, as noted above, may comprise a graphics card. The graphics card (load2) may consume so much power so as to exceed the power capacity of power supply 14. Thus, the second power supply 16 is provided to help satisfy the power consumption needs of the load2. As such, load2 receives separate operating power from each of power supplies 14 and 16. Load1, in the example of FIG. 1, receives operating power from only one power supply—internal power supply 14 via connector 20.

The interface adapter 18 comprises various components such as components for DC-to-DC voltage conversion and filtering. The interface adapter 18 may also comprise a path for which air can flow to help in cooling the system 10. The interface adapter 18 is removable. Thus, in accordance with various embodiments, a user installs the interface adapter 18 into the chassis 12 when, for example, desiring to power load2 with a second, external power supply 16. The interface adapter 18 receives DC power from power supply 16 and provides the DC power to connector 24 on load2. Load2 comprises a separate connector 22 in various embodiments through which power is supplied to load2 from the internal power supply 14. The connector 22 on load2 may comprise a bus connector over which data and power is provided to the load2. In such embodiments, connector 24 is a separate connector from the bus connector and is dedicated for use to provide power to load2.

Figure 2:
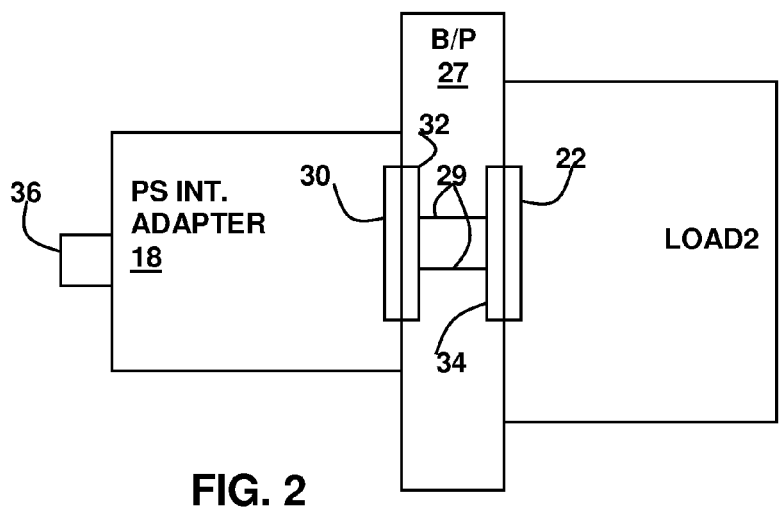
FIG. 2 shows an illustrative embodiment of the connection between one of the power supplies of FIG. 1 and the load.

FIG. 2 illustrates an embodiment in which the power supply interface adapter 18 electrically couples to load2. A backplane 27 is provided in the chassis. The backplane 27 comprises a printed circuit board (PCB) containing one or more conductive traces 29 to electrically connect connectors 22 and 32 provided on the backplane. The backplane 27 comprises electrical connectors 32 and 34. Connector 32 is configured to receive a corresponding connector 30 from the interface adapter 18. Connector 34 is configured to receive a corresponding connector 22 from load2. The external power supply 16 connects to power supply interface adapter 18 via connector 36. Through connectors 32, 34 and conductive traces 29, the interface adapter 18 provides operating power to load2. In other embodiments, cables are used to interconnect the power supply interface adapter 18 to load2.

Figure 3:
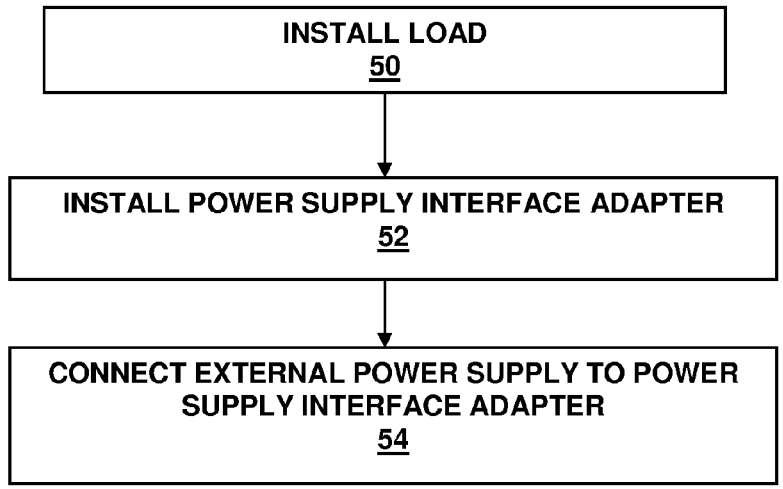
FIG. 3 shows a method in accordance with various embodiments.

FIG. 3 illustrates a method in accordance with various embodiments of the invention. The various actions depicted in FIG. 3 can be combined together as desired. Further, the order of the actions can be varied from that shown in FIG. 3.

At 50, the method comprises, if not already installed, installing a load (e.g., load2) in the chassis 12 of system 10. At 52, the method further comprises installing the power supply interface adapter 18 in the chassis, if not already installed. At 54, the method comprises connecting the external power supply 16 to the power supply interface adapter 18.

Figure 4:
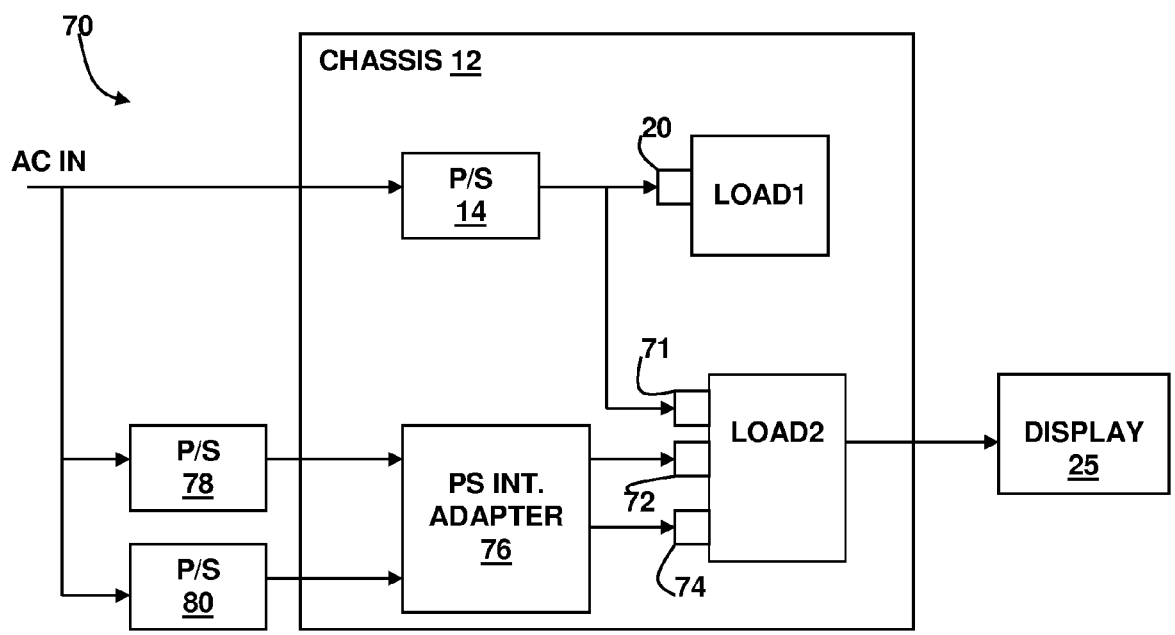
FIG. 4 illustrates an embodiment in which more than two power supplies couple to and provide power to a load.

FIG. 4 illustrates an alternative embodiment of a system 70. In this embodiment, load2 comprises more than two connectors for receiving operating power from more than two power supplies. In the example of FIG. 4, three power supplies are shown to provide operating power to load2. A first power supply comprises the internal power supply 14 (internal to the chassis 12) and provides power to load1 via a connector 20. The other two power supplies comprise external power supplies 78 and 80 (external to the chassis 12). A removable power supply interface adapter 76 is installed in the chassis 12 of the system 70. Interface adapter 76 receives DC power from external power supplies 78 and 80 and provides operating power to connectors 72 and 74, respectively, on load2. Connector 71 couples to the internal power supply 14.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is clamed is:

1. A system, comprising:
    a chassis;
    a first power supply internal to said chassis;
    a second power supply external to said chassis;
    a third power supply external to said chassis;
    an adapter internal to said chassis and coupled to the second and third power supplies, wherein said adapter provides DC-to-DC voltage conversion;
    a first load that receives power from the first power supply and not the second power supply; and
    a second load that receives power from the first, second, and third power supplies, wherein power from the second and third power supplies is provided via the adapter, and wherein the second load has separate connectors to receive power from each of the first, second, and third power supplies.

2. The system of claim 1 wherein the second load comprises a graphics card.

3. The system of claim 1 wherein said second load comprises circuitry provided on one circuit card.

4. The system of claim 1 further comprising a backplane coupled to the second load and through which power from the second power supply is provided to the second load.

5. The system of claim 1 wherein the system comprises a computer.

6. A method, comprising:
    installing a power supply interface adapter in a computer;
    connecting first and second external power supplies to said power supply interface adapter to thereby provide power to a load in addition to power provided by an internal power supply; and
    connecting power from said internal power supply to a first connector on said load and from said first and second external power supplies to said load via second and third connectors on said load.

7. The method of claim 6 further comprising installing said load into a computer, said load comprising a graphics card.

8. The method of claim 6 wherein installing said power supply interface adapter comprises mating said power supply interface adapter to a backplane.

* * * * *